United States Patent [19]

Ping, III et al.

[11] Patent Number: 4,745,021

[45] Date of Patent: May 17, 1988

[54] NONPILLING FIBROUS SUBSTRATE FOR POUCHED LAUNDRY PRODUCTS

[75] Inventors: Vernon S. Ping, III, Cincinnati; Eric E. Beard, West Chester, both of Ohio

[73] Assignee: The Procter & Gamble Company, Cincinnati, Ohio

[21] Appl. No.: 944,147

[22] Filed: Dec. 19, 1986

[51] Int. Cl.$^4$ .......................... B32B 3/00; B65D 85/84; C11D 17/00

[52] U.S. Cl. .......................................... 428/195; 428/35; 206/0.5; 206/524.1; 252/90

[58] Field of Search .................... 428/35, 195; 206/0.5, 206/524.1; 252/90

[56] References Cited

U.S. PATENT DOCUMENTS

| | | | |
|---|---|---|---|
| 4,108,600 | 8/1978 | Wong | 8/137 |
| 4,113,630 | 9/1978 | Hagner et al. | 252/8.6 |
| 4,223,029 | 9/1980 | Mahler et al. | 427/242 |
| 4,259,383 | 3/1981 | Eggensperger et al. | 428/72 |
| 4,348,293 | 9/1982 | Clarke et al. | 252/90 |
| 4,410,441 | 10/1983 | Davis et al. | 206/0.5 |
| 4,416,791 | 11/1983 | Haq | 252/90 |
| 4,433,783 | 2/1984 | Dickinson | 206/484 |
| 4,515,703 | 5/1985 | Haq | 252/92 |
| 4,551,377 | 11/1985 | Elves et al. | 428/137 |
| 4,571,924 | 2/1986 | Bahrami | 53/453 |
| 4,613,538 | 9/1986 | Wendell et al. | 428/198 |
| 4,638,907 | 1/1987 | Bedenk et al. | 206/0.5 |

FOREIGN PATENT DOCUMENTS

| | | | |
|---|---|---|---|
| 66463 | 12/1982 | European Pat. Off. . | |
| 8001078 | 5/1980 | PCT Int'l Appl. | 252/90 |
| 1298454 | 12/1972 | United Kingdom . | |

*Primary Examiner*—John E. Kittle
*Assistant Examiner*—Patrick J. Ryan
*Attorney, Agent, or Firm*—Leonard Williamson; Richard C. Witte

[57] ABSTRACT

Disclosed is a through-the-wash laundry product comprising:

(a) a water-permeable, water-insoluble fibrous substrate;

(b) a laundering composition enclosed within a pouch comprising the fibrous substrate; wherein (c) the substrate pouch has on its outside surface a water-insoluble, spaced-apart glue pattern adapted to reduce pilling of the fibrous substrate when the product is used in the laundering of fabrics.

8 Claims, 2 Drawing Sheets

NONPILLING FIBROUS SUBSTRATE FOR POUCHED LAUNDRY PRODUCTS

FIELD OF INVENTION

This invention relates to substrates used to enclose laundry actives and more particularly to products made therewith.

BACKGROUND OF THE INVENTION

This invention relates to a nonpilling fibrous substrate for pouched laundry products.

Pouched Laundry Products

When, for example, loose through-the-wash-and-rinse fabric softener particles are added to the wash step of a laundering process, it is inevitable that some of the particles will not adhere to or become trapped in the folds of the fabrics and will, therefore, be lost in the discarded wash solution or rinse water. In order to avoid such loss, the particles can be added to the wash solution in a sealed, porous water-insoluble pouch such as the types described in U.S. Pat. Nos. 4,571,924, Bahrani, issued Feb. 25, 1986, and 4,223,029, Mahler et al., issued Sept. 16, 1980, both incorporated herein by reference. Detergent granules can be included in the pouch with the softener particles. When the pouch is placed in water in the wash step of the laundering process, the detergent dissolves, but the softener particles remain in the pouch. The pouch remains with the fabrics through the wash and rinse. When the pouch is tumbled with the fabrics in the dryer, the softener particles release the softener, which melts onto the pouch material and is transferred from the pouch material to the fabrics as the pouch comes into contact with the fabrics during the drying cycle.

Preferred pouch structures are multi-pouch porous sheet structures such as described in U.S. Pat. No. 4,571,924, supra; allowed application U.S. Ser. No. 675,804, Bedenk et al., filed Nov. 28, 1984; and U.S. Pat. No. 4,259,383, Eggensperger et al., issued Mar. 31, 1981, all incorporated herein by reference. In a single pouch structure, the softener particles tend to collect in a relatively small area of the structure, whereas in a multi-pouch sheet structure the softener particles are distributed over a larger area of the structure thereby facilitating more even transfer of softener to fabrics in the dryer.

Suitable pouch substrate materials include paper, nonwoven synthetics such as spunbonded polyester, porous formed film plastic sheet material and combinations thereof.

Selected fibrous substrates improve the release of fabric softener in a pouched granular detergent/softener product form over one made with an all cellulosic paper substrate.

The problem: However, the use of some fibrous substrates, e.g., certain commercially available spunbonded polyesters, while improving release of softener, have a serious negative. They pill in the wash. When such a pouched substrate is used in the washer and dryer, the fibers on the outside of the substrate are pulled away from the surface causing unsightly balls and clumps of fibers to form. These balls and clumps of fibers are referred to as "pills," hence the therm "pilling." Substrate pilling is a consumer negative for a number of reasons.

One negative is that these pills of loose fibers act as lint scavengers in the washer and dryer, picking up lint from clothing which causes the outside of the sheets to be covered with different colored lint from the wash load. The different colored scavenged lint gives the appearance that the laminate substrate is pulling fibers off the clothing in the wash load. Because of this scavenging of lint pilling is viewed as a severe consumer negative.

Another negative is that a severely pilled sheet can attach to itself like a Velcro®-like attacher to form unwanted folds or extra pockets. If extra pockets of a product sheet or pouch are attached one to the other, it is very difficult for enclosed detergent, bleach, etc., in the inner pockets or folds to diffuse. Undissolved product results.

OBJECTS OF THE INVENTION

It is an object of the present invention to provide reduced pilling in fibrous substrate pouched laundry products.

It is also an object of the present invention to provide a through-the-wash pouched laundry product with improved detergent and bleach solubility manifested by reduced undissolvables in the pouch after the wash.

Another object of the present invention is to make a compact and more efficient laminated through-the-wash laundry fabric softener containing product which is more efficient in the dryer.

Yet another object of the present invention is to provide reduced softener staining for through-the-wash laminates containing loose softener particles.

Still another object of the present invention is to provide a superior laminated through-the-wash laundry product for consumer use which contains an effective amounts of various laundry actives in a convenient sheet or pouched form.

Other objects will become apparent from the following disclosure.

SUMMARY OF THE INVENTION

The present invention is a through-the-wash and dryer laundry product which comprises:

(a) a water-permeable, but water-insoluble, pillable, fibrous substrate; and (b) a laundering composition contained within an enclosed pouch of said substrate;

(c) said substrate pouch having on its outside surface a spaced-apart pattern of water-insoluble glue adapted to reduce the pilling of said fibrous substrate when said product is used.

DETAILED DESCRIPTION OF THE INVENTION

Figure 1:
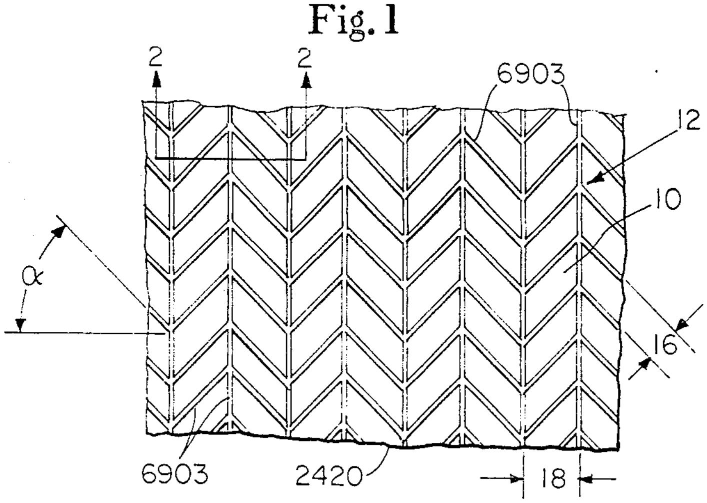
FIG. 1 shows a substrate section having a spaced-apart herringbone pattern of glue which is applied to one of its surfaces.

Any method of locking down the pillable substrate surface fibers, such as by applying a uniform coating of glue thereon, also cuts down on the porosity of the substrate. To insure porosity a spaced-apart glue pattern is printed on the outside surface of the substrate. This spaced-apart pattern leaves open areas which can range from about 30% to about 99% on the sheet surface and thereby maintains the porosity of the substrate needed for certain pouched laundering active solubility. Preferably the open areas range from about 50% to 97%, and more preferably from about 70% to about 95%. The glue pattern would occupy the balance of the substrate surface. Thus, the corresponding occupied surface area for the glue ranges are from about 1% to about 70%, more preferably from about 3% to about 50%, and most preferably from about 5% to about 30%. There is a direct relationship between the amount of open and the glue bonded areas of the substrate and its porosity.

The glue is applied to the substrate at a level of from about 3 to about 150 grams, preferably from about 5 to about 65 grams, and most preferably from about 10 to about 30 grams per square meter of substrate.

In a preferred embodiment the spaced-apart glue patterned substrate is used to pouch loose softener particles for a softener staining control improvement. The spaced-apart printed glue pattern on the substrate provides an improvement in softener release via controlling the rate of release of softener from the substrate in the dryer. While not being bound by any theory, it is believed that the spaced-apart glue pattern on the substrate acts as a thermo heat sink which helps to control the rate of release of softener via spreading the molten softener particles more evenly across the pouched sheet. The spaced-apart glue patterned substrate helps to prevent softener staining in the dryer. The spaced-apart glue pattern printed on the outside surface of the substrate of the pouched product also reduces softener staining, and virtually eliminates the fibrous substrate pilling. However, if printed on the inside surface of substrate, mostly the fabric softener staining benefit is realized.

On the other hand, if the spaced-apart glue pattern is impregnated well into the substrate, from outside to inside surfaces, both reduced pilling and improved softener staining benefits can be realized.

The Spaced-Apart Hot Melt Glue Patterned Printing Process

This system of making a substrate of this invention can be broken down into three parts: (1) the general printing process or method, (2) the spaced-apart printed pattern itself, and (3) the glue or adhesive. It should be noted that the following system (the hot melt glue patterned printing process, the herringbone pattern or the 6903 adhesive) is only one of many systems that can be used to make the spaced-apart glue patterned substrate of this invention. The total system and its parts are intended to be nonlimiting examples.

The hot melt glue pattern can be printed with a Thermo Intaglio Graphics process with a rotogravure hot melt system such as manufactured by Roto-Therm, Inc., Anaheim, Calif. 92807. The illustrated (FIG. 1) printed pattern is a spaced-apart herringbone pattern. A preferred adhesive (glue) is a polyamide adhesive sold under the trade name of Henkel 6903. When cured it is water insoluble.

The gravure system consists of an engraved roll that can be engraved to almost any spaced-apart pattern, a silicon rubber back-up roll and a doctor blade assembly that wipes the gravure roll and meters the adhesive. The amount of adhesive printed is primarily determined by the engraved spaced-apart pattern cut into the gravure roll. The substrate is passed through a nip between the gravure roll and back-up roll at which point the molten adhesive is transferred to the substrate. Preferably, the adhesive is then pressed into the substrate in another nip and then cooled, cured and rewound for use in the final product.

This rotogravure printing method is only one of many that could be used. Other methods that could be used include flexographic offset printing and screen printing techniques. Laboratory bench scale methods such as screen and engraved plate transfer can also be used. An infinite number of spaced-apart glue patterns could be used to control pilling of substrates, as long as the spaced-apart pattern is spread in such a way so as to lock down the loose fibers across the substrate while providing porosity for dissolution of detergent and/or bleach materials in the wash.

The illustrated spaced-apart glue pattern 12 is the herringbone pattern shown in FIG. 1. This is how it appears to scale on a preferred patterned substrate itself, as well as on the rotogravure cylinder used to print the hot melt. This herringbone pattern is engraved into the gravure cylinder such that it delivers an average of 19.3 grams $\pm 1$ gram of glue per square meter of substrate. The engraved pattern is made up of short zigzag 45° angle (alpha) lines that are 0.32 inch (0.81 cm) long, 0.010 inch (0.025 cm) wide and 0.009 inch (0.023 cm) deep (FIG. 1). The preferred adhesive is a polyamide hot melt adhesive (Henkel 6903 made by the Henkel Co.). Any other compatible, water-insoluble adhesive can be used. Other suitable hot melt adhesives include: polyolefin, polyesters and other polyamides, all of which are printable, water-insoluble, thermo plastics. The densities of hot melt adhesives can range from 0.75 to 1.35 gram/cubic centimeters. The term "insoluble glue" as used herein means having a solubility in 49° C. water of 5% or less, preferably 3% or less.

Solvent-based adhesives can also be used to control pilling on the substrates of the present invention, as long as they satisfy the basic requirements of washer and dryer survivability while still locking down the pillable substrate fibers. However, the curing stage of solvent-based adhesives generally requires high temperatures to drive off the solvents. The major advantage of using hot melt adhesives is that they are cured solid by cooling to room temperature. Thus, the latter is more preferred.

Pillable Fibrous Substrates

Pillable fibrous substrates as defined herein are pillable substrates, e.g., those made from polyesters, polyolefins, nylons, rayons, cellulose, mixtures thereof, and the like. The substrates can include staple fibers and continuous fibers. The glue pattern of the present invention prevents such substrates from pilling in a normal wash environment. It is essential that the substrate is compatible for laundry and dryer use.

The typical properties of some preferred substrates are set out in Table 1.

TABLE 1

Typical Physical Properties* of REEMAY ® Spunbonded Polyester

| Style | Unit Weight oz/yd² | Unit Weight g/m² | Thickness mils | Sheet Grab Tensile MD lbs. | Sheet Grab Tensile XD lbs. | Trapezoid Tear MD lbs. | Trapezoid Tear XD lbs. | Mullen Burst psi | Mullen Burst kPa | Frazier Air Perm. @ 0.5" $H_2O$ |
|---|---|---|---|---|---|---|---|---|---|---|
| 2006 | 0.6 | 20 | 5.5 | 11 | 8 | 4 | 5 | 11 | 76 | 1000 |
| 2011 | 0.70 | 23 | 6.5 | 16 | 13 | 7 | 7.5 | 12 | 83 | 1050 |
| 2014 | 1.0 | 34 | 8 | 24 | 22 | 8.5 | 8.5 | 17 | 117 | 800 |
| 2016 | 1.35 | 46 | 9 | 9 | 24 | 11 | 12 | 36 | 248 | 525 |
| 2024 | 2.1 | 68 | 11.5 | 50 | 40 | 10 | 11 | 48 | 330 | 350 |
| 2033 | 2.95 | 100 | 15.5 | 83 | 68 | 16 | 19 | 84 | 580 | 250 |
| 2250 | 0.5 | 17 | 4 | 10 | 9 | 4 | 4 | 7 | 48 | 1100 |
| 2275 | 0.75 | 25 | 6 | 16 | 12 | 5 | 5 | 10 | 69 | 874 |
| 2200 | 1.0 | 34 | 7 | 21 | 19 | 7 | 8 | 15 | 103 | 650 |
| 2214 | 1.35 | 50 | 10 | 33 | 34 | 11 | 11 | 34 | 234 | 525 |
| 2295 | 2.95 | 100 | 18 | 73 | 70 | 16 | 17 | 76 | 524 | 300 |
| 2410 | 1.15 | 39 | 11 | 14 | 11 | 6 | 6 | 9 | 62 | 975 |
| 2415 | 1.55 | 53 | 14 | 22 | 16 | 11 | 9 | 16 | 110 | 700 |
| 2420 | 1.85 | 63 | 15 | 28 | 22 | 13 | 11 | 18 | 124 | 650 |
| 2430 | 2.4 | 81 | 17 | 39 | 32 | 17 | 14 | 29 | 200 | 425 |
| 2440 | 2.9 | 98 | 18 | 51 | 45 | 19 | 16 | 38 | 262 | 350 |
| 2470 | 6.0 | 203 | 28 | 110 | 100 | 32 | 27 | 82 | 565 | 150 |

*These are typical properties and should be used as a guide only.

Note: REEMAY ® is a registered trademark of the DuPont Company, Wilmington, Delaware. The above data are published in one of DuPont's bulletins. Styles are subject to change. The above date are reported as average properties. (Table 1 continued The present invention comprises a reduced pilling, fibrous substrate for a laminated, pouched, or bagged through-the-wash laundry product. It is advantageous that the pouch or bag contains or supports the active (or actives) in a premeasured, single use amount and releases them at the desired point in the wash, rinse or dryer cycle. The substrate of this invention may also be used to separate or compartmentalize incompatible ingredients until they are released into the wash solution or dryer. A specially designed, reduced pilling substrate may be particularly useful to effect a sequenced delivery in which the detergent and bleach ingredients are released in the wash cycle, a soil release agent is released in the wash and/or rinse cycle and a softener is released in the dryer. The substrate can be used to take almost any physical form including folded and/or laminated pouches, sheets, bags, etc. An example of a particularly useful product form for the present invention is a two-ply multi-pouched laminated article disclosed in allowed U.S. application Ser. No. 675,804, W. T. Bedenk and K. L. Harden, filed Nov. 28, 1984, incorporated herein by reference in its entirety, wherein at least one of the two plies is a reduced pilling, fibrous substrate with a spaced-apart glue pattern.

The present invention is preferably used as part of a fully formulated stand-alone detergent product wherein appropriate detergent components are present and released in the wash along with a peroxyacid bleach and a soil release agent. Useful detergent compositions for use with this invention can include essentially any typical laundry detergent containing one or more types of organic surfactant along with detergency adjunct materials. The organic surfactant is selected from the group consisting of anionic, nonionic, ampholytic and zwitterionic surfactants, and mixtures thereof. U.S. Pat. No. 3,664,961, Norris, issued May 23, 1972, incorporated herein by reference, describes at Col. 1, line 68, to Col. 9, line 3, suitable surfactants useful herein. The anionic and nonionic surfactants are preferred. Nonlimiting examples of adjunct materials which can be used in the detergent composition include soil suspending agents, perfumes, optical brighteners, bleaches, processing aids, alkalinity sources and enzymes. Nonlimiting examples of powdered detergent materials suitable for use with the present invention are disclosed in U.S. Pat. No. 4,404,128, B. J. Anderson, issued Sept. 13, 1983, incorporated herein by reference.

Fabric softeners can also be a laundry active of the present invention. The fabric softeners can take several forms including: pouched loose particles, patterned "dots" applied to an inside surface of pouch substrate materials, as a substrate coatings, etc. A preferred softener is a particle formulated to survive (i.e., not dissolve in) the wash and rinse cycles, and then melt and become distributed on the fabric in the dryer cycle. The softener particle composition should have a wash water survival of at least 25%, preferably at least 40% by weight or higher. Numerous examples of softener/antistat compositions which function in this manner are taught in the literature, e.g., U.S. Pat. Nos. 4,113,630, Hagner et al., issued Sept. 12, 1978, and 4,108,600, Wong, issued Aug. 22, 1978, which are incorporated herein by reference.

A preferred particulate fabric softener is one comprising an inner core of solid fabric softener composition surrounded by a water-insoluble coating material which melts or disintegrates in the dryer to release the softener at that stage of the laundering process. A preferred softener composition for the core of such a particle has the following formula:

TABLE 2

| Ingredient | Wt. % |
|---|---|
| Ditallowdimethylammonium methylsulfate (DTDMAMS) | 42.4 |
| Sorbitan monostearate | 21.3 |
| Cetyl alcohol | 21.3 |
| Bentonite clay | 12.0 |
| Perfume | 3.0 |
| Total | 100.0 |

Softener Making Process

Step 1.

The DTDMAMS is heated in a reaction vessel at 71° C. under vacuum (Ca. 710 mm Hg) for 4 hours to remove residual moisture and/or isopropanol. The cetyl alcohol and sorbitan monostearate are then added, and the molten "triblend" is mixed for one hour at about 71° C.

The triblend is transferred into a PVM 40 Ross mixer (Charles Ross & Sons Company, Hauppauge, N.Y. 11788). The temperature of the triblend is then raised to 79° C.-85° C. under vacuum (about 330-430 mm Hg). When the temperature has stabilized in this range, the Ross' anchor and disperser are turned on and the clay is added. The mixture is blended for 5 minutes and then sheared with the Ross' colloid mixer for 20 minutes. The perfume is then added and the mixture is blended for 5 minutes with the anchor, dispenser and colloid mill still on. The softener composition is then poured into trays and cooled overnight at about 4° C.

Step 2.

The solid softener core composition is then converted to particles by milling in a Fitzmill, Model DA506 (The Fitzpatrick Company, Elmhurst, Ill. 60126) at 4740 rpm's through a 4 mesh screen. The particles are then sized through 12 on 30 (U.S. Standard screens, 1.7-0.6 mm particle size).

Step 3.

The particles are then coated with a hot melt of fatty alcohol-based coating. The coating is a mixture of 90% stearyl alcohol and 10% Elvax-4310, a terpolymer of ethylene, vinyl acetate and acid from E. I. du Pont de Nemours & Co., Polymer Products Dept., 1007 Market St., Wilmington, Del. 19898. The coating is applied in an 18 Inch Wurster coater (Coating Place, Inc., P.O. Box 248, Verona, Wis. 53593). A detailed description of this type of equipment can be found in U.S. Pat. No. 3,196,827, Wurster et al., issued July 27, 1965, incorporated by reference herein.

Briefly, the Wurster Coater consists of an apparatus that is capable of suspending the softener core particles on a rapidly moving warm air stream. Encapsulation is accomplished by passing the softener particles through a zone of finely atomized droplets of coating. As the particles move up and away from the coating nozzle, the coating begins to solidify as the particles cool. When the particles can no longer be fluidized by the air stream, they move down in the opposite direction of the fluidizing air. The coated particles then reenter the coating zone and are recycled until the desired amount of coating is applied. The coating cycle takes place within a single chamber which preferably has a partition to separate the particles moving up through the coating zone from those moving down through the cooling zone.

The following conditions are used to apply a hot melt coating:

| Stearyl Alcohol/Elvax | |
|---|---|
| Temperature | 79° C. |
| Fluidizing Air | 15.8 Cu.M/min. at 40.5° C. |
| Atomizing Air Volume | 0.25 Cu.M/min. |
| Atomizing Air Rate | 4218 g/sq.cm. |
| Inlet Air Temperature | 20° C.-38° C. |
| Outlet Air Temperature | 20° C.-38° C. |
| Pump Rate | 0.2 Kg/min. |
| Nozzle Size | CPI-18-A74* |
| Partition Size | 216 mm × 267 mm |
| Partition Gap | 19 mm |
| Run Time | 22 min. |

*Available from Coating Place, Inc.

The amount of fatty alcohol coating applied to the softener particles is about 15% by weight of the total coated particle. After the coating process is complete the particles are resized through 12 on 20 mesh and are then ready for use "as is" or for blending into detergent and/or bleach granules.

Step 4.

Softener core particles prepared as in Step 3 are coated with ethyl cellulose based coating instead of fatty alcohol. The coating is applied by spraying a 10% solids solution in methanol of 9 parts ethyl cellulose and 1 part dibutyl sebacate. The coating is applied in an 18 Inch Wurster coater as described in Step 3. The ethyl cellulose used is Ethocel Std. 4, (Dow Chemical Co., Midland, Mich. 48640) which has an Ubbelhhode viscosity of 3.0-5.5, measured at 25° C. as a 5% solution in 80% toluene/20% ethanol.

The following conditions are used to apply a solvent based coating:

| | |
|---|---|
| Fluidizing Air | 15.8 Cu.M/min. at 40.5° C. |
| Atomizing Air Volume | 0.37 Cu.M/min. |
| Atomizing Air Rate | 5624 g/sq.cm. |
| Inlet Air Temperature | 38° C.-43° C. |
| Outlet Air Temperature | 30° C.-32° C. |
| Pump Rate | 0.2 Kg/min. |
| Nozzle Size | CPI-18-A74* |
| Partition Size | 216 mm × 267 mm |
| Partition Gap | 19 mm |
| Run Time | 120 min. |

*Available from Coating Place, Inc.

The amount of ethyl cellulose/dibutyl sebacate solids coated onto the particles is about 5% by weight of the total coated particle weight. When the coating is completed, the softener particles are resized through 12 on 30 Mesh U.S. Standard screens and are then ready for use "as is" or for blending into detergent granules.

Detergent/Softener Composition A

A granular detergent/softener composition is prepared by mixing 4 parts of the above softener particles of either Step 3 or Step 4 with 96 parts of the following granular detergent composition.

| Ingredient | Wt. % |
|---|---|
| Sodium $C_{13}$ linear alkylbenzene sulfonate | 16.5 |
| Sodium $C_{14}$-$C_{15}$ linear fatty alcohol sulfate | 16.5 |
| Sodium sulfate | 23.8 |
| Sodium silicate | 9.2 |
| Polyethylene glycol (MW = 8000) | 0.9 |
| Polyacrylic acid | 1.3 |
| Sodium tripolyphosphate | 13.7 |
| Sodium carbonate | 4.8 |
| Methyl cellulose | 3.6 |
| Optical brightener | 1.3 |
| Protease enzyme | 1.6 |
| Moisture and miscellaneous | 6.8 |
| Total | 100.0 |

Bleach/Softener Composition B

A granular bleach/softener composition is prepared by mixing 4 parts of the above softener particles of either Step 3 or Step 4 with 96 parts of the following granular bleach composition prepared using the procedure of Example I described in U.S. Pat. No. 4,374,035, Bossu, issued Feb. 15, 1983 incorporated herein by reference in its entirety.

| Ingredient | Wt. % |
|---|---|
| Diperoxydodecanedioic acid | 24.0 |
| Dodecanedioic acid | 2.9 |
| Sodium $C_{13}$ linear alkylbenzene sulfonate | 5.5 |
| Boric acid | 27.7 |
| Sodium sulfate | 39.7 |
| Miscellaneous | 0.2 |
| Total | 100.0 |

This Composition B is used at a product level to provide at least 10 ppm of available oxygen in an 18-gallon wash (68.1 liters).

The present invention will be further understood by the following nonlimiting examples.

DETAILED DESCRIPTION OF THE DRAWINGS

FIG. 1 shows a section of substrate 2420 having a spaced-apart herringbone pattern 12 of glue 6903. The distances 18 between the vertical lines of glue 6903 are about 0.222 inch (0.56 cm) and the distances between the 45° alpha angled glue 6903 lines are about 0.11 inch (0.28 cm). The other dimension and characteristics of substrate 2420 are shown in Table 1.

Figure 2:
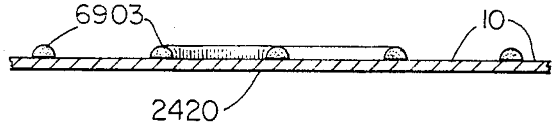
FIG. 2 is a cross-sectional view through the spaced-apart herringbone pattern with glue of FIG. 1.

FIG. 2 is a cross-sectional view of FIG. 1 through lines 2—2. Glue 6903 is shown raised, but can be impregnated into substrate 2420 by rolls or vacuum when the glue is hot using techniques known in the art.

Figure 3:
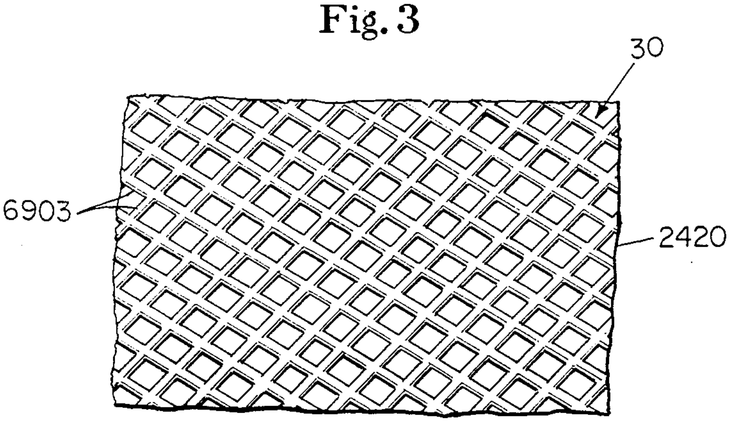
FIG. 3 is a substrate section having a space-apart No. 10 diamond crosshatch pattern of glue.

FIG. 3 is another example of a sectional view of a spaced-apart No. 10 diamond crosshatch pattern 30 of glue on a substrate 2420.

Figure 4:
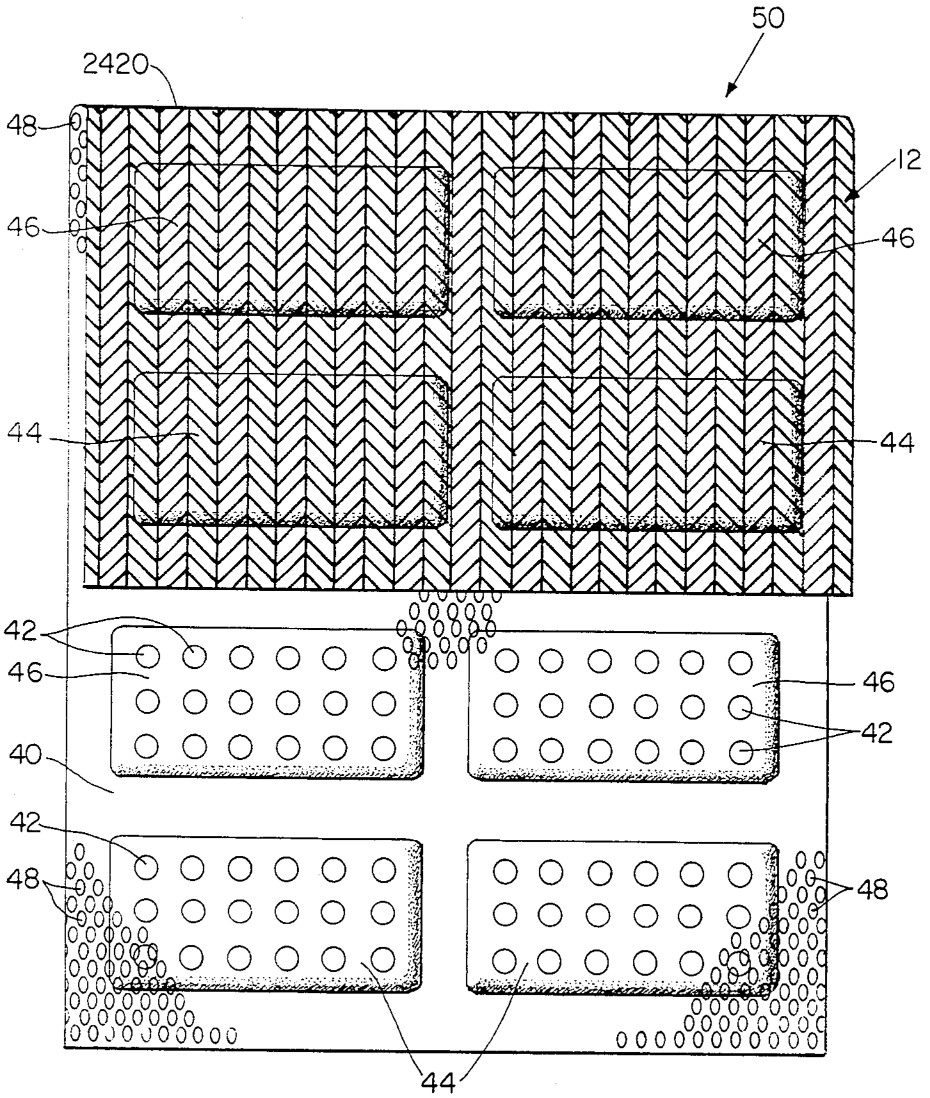
FIG. 4 shows a view from the bottom of a folded 12-celled laminated, multi-pouched, multi-action laundry product.

FIG. 4 is a top and bottom view of a folded, laminated, 12-multi-pouched laundry product sheet 50. The top sheet 40 is made of a strengthened tissue similar to the one described in Example II of allowed U.S. patent application Ser. No. 748,654, Strampach et. al., filed June 25, 1985, incorporated herein by reference in its entirety. Concentrated softener dots 42 are immobilized onto the inside surface of the top sheet 40. The product sheet 50 has four mini-pouches (cells) of bleach (whiteners and stain removers) 44; two on each end of product sheet 50. The product sheet 50 also has eight cells of detergent 46. The bottom sheet substrate 2420 is shown with the herringbone pattern 12 of glue 6903. Four cells of the detergent 46 are covered because of the fold by the four cells of the top sheet 40. The smaller dark circular areas 48 of top sheet 40 are called "dimples" 48; they correspond to the "cavities" or the bottom side of the "domes" of the Strampach et al. strengthened paper tissue, discussed above. Thus, the softener dots 42 are applied to the "dome" side of top sheet 40. See Example IV herein for more disclosure of a product of this type.

EXAMPLE I

A substrate of pillable, fibrous nonwoven (DuPont REEMAY® 2420, a spunbonded, 63 g/m², 4 denier polyester nonwoven fabric) is printed with a spaced-apart pattern of a hot melt (196°-199° C.) of Henkel 6903 using the following procedure:

Using a Thermo Intaglio Graphics process with a rotogravure hot melt system made by Roto-Therm, Inc., the spaced-apart herringbone glue pattern 12 of FIG. 1 is printed 33 cm wide on a 40 cm wide web of substrate 2420 at a level of about 19.3 grams per square meter of printed substrate.

An 11.4 cm×28 cm (4.5 in.×11 in.) sheet of the spaced-apart, herringbone glue patterned substrate is cut from the web.

The glue pattern occupies about 16.3% of the surface of substrate 2420 and the other 83.7% is open surface area.

EXAMPLE II

The following is a breakdown of the granular detergent component of Composition A.

| | Base Granules | |
|---|---|---|
| | Weight % | Grams Final Composition Per Use (Ex. III) |
| Sodium $C_{13}$ linear alkylbenzene sulfonate | 22.1 | 5.110 |
| Sodium $C_{14-15}$ alkyl sulfate | 22.1 | 5.110 |
| Sodium silicate (1.6 ratio) | 13.7 | 3.172 |
| Sodium sulfate | 32.2 | 7.455 |
| Polyethylene glycol (MW = 8000) | 1.5 | 0.340 |
| Sodium polyacrylate (MW = 4500) | 2.0 | 0.453 |
| $C_{12-13}$ alcohol polyethoxylate (6) | 3.0 | 0.680 |
| Sodium diethylenetriamine pentaacetate | 1.5 | 0.340 |
| Moisture | 2.0 | 0.462 |
| | | 23.122 |
| Preblend | | |
| Base granules | | 23.122 |
| Sodium tripolyphosphate hexahydrate (powdered) | | 20.576 |
| | | 43.698 |

| | Grams Final Composition Per Use |
|---|---|
| Admix | |
| Preblend | 43.698 |
| Sodium tripolyphosphate (STP) hexahydrate (granular) | 19.429 |
| Dye | 0.003 |
| Brightener | 0.613 |
| Suds suppressor prill comprising dimethylsilicone, silica, sodium tripolyphosphate and polyethylene glycol (MW = 8000) | 1.703 |
| Protease | 2.044 |
| Sodium carbonate | 4.000 |
| | 71.490 |
| Spray-On | |
| Admix | 71.490 |
| Mineral oil | 0.710 |
| | 72.200 |

The base granules are produced by spray-drying an aqueous crutcher mix of the components on a ten foot tower using a crutcher temperature of 200° F., a size 3½ nozzle to make fine granules, and silicone deaerants. A second drying stage on a continuous fluid bed is used to reduce moisture to 2%.

The base granules are then admixed with powdered STP hexahydrate to form the preblend. The preblend is compacted at 50 psig roll pressure on a 4 in. by 10 in. chilsonator, and screened to select a −14 (1168 microns)/+65 (208 microns) particle size cut (Tyler mesh). Oversized particles are collected and granulated on a Fitzmill, Model DA506 (The Fitzpatrick Company, Elmhurst, Ill. 60126), using a 14 mesh screen and low rpm's. This is screened to select a −20(833 microns)/+48(295 microns) particle size cut. Both materials are dedusted by blowing off fines in a fluid bed dryer using ambient air.

The admix is prepared as a 400 pound batch in a drum mixer. Carbonate, granular STP (with dye sprayed-on), brightener, enzymes, and suds suppressor prills are blended with the compacted mainstream product cut and regranulated overs at a ratio of mainstream product cut to overs of about 7 to 1. Mineral oil is sprayed on the final admix in 30 to 40 pound batches at a 1% level using a Forberg Mixer.

EXAMPLE III

A preferred mode 6-multi-pouched laundry product consisting of the spaced-apart glue patterned, fibrous nonwoven substrate of Example I containing Detergent/Softener Composition A (Example II) and Bleach-/Softener Granular Composition B is made using the following procedure. The 11.4 cm×28 cm (4.5 in.×11 in.) sheet of Example I is embossed or stretched to form a single row of 6 cells or mini-pouches similar to the 12-cell one shown in FIG. 4 herein and identified as bleach cells 44 and detergent cells 46. (Also see the multi-pouched articles in FIGS. 7 and 8 of U.S. Pat. No. 4,571,924, A. S. Bahrani, issued Feb. 25, 1986, incorporated herein by reference in its entirety). The 6 cells are each embossed to a depth of approximately 1.3 cm (0.5 in.). Each cell is approximately 3.6 cm. (1.4 in.) wide and approximately 9.8 cm. (3.8 in.) in length, each with about 30 cc capacity. In the embossed "bottom" sheet, one cell on each end of the sheet are each filled with approximately 14 grams (0.50 oz.) of the granular Bleach/Softener Composition B for a total of 28 grams per 6-multi-pouched product. The remaining 4 cells are each filled with approximately 18 grams (0.64 oz.) of the granular Detergent/Softener Composition A for a total of 72 grams. An unembossed printed glue patterned substrate (topsheet ply) of Example I is then attached to the filled, embossed ply by heat sealing with a printed polyethylene glue patterned to correspond to the rims surrounding the 6 cells of the embossed ply for lamination sealing. There are about 3.3 grams of loose softener particles per 6-cell sheet. Substrate pilling of this product is virtually eliminated when using for laundering.

EXAMPLE IV

Another multi-pouched laundry product is made similar to the one shown and described as FIG. 4. In this embodiment only the detergent composition of Composition A is used and only the bleach of Composition B is used. Softener dots are printed on the inside surface of the top sheet ply in a spaced-apart pattern for a total level of 4 grams of softener per 12-cell sheet.

The 12 cells are embossed per 6 inch×11 inch (15.24 cm×27.94 cm) sheet, using the substrate 2420 of Example 1. The composition of the patterned softener dots is the uncoated softener core material of Table 2. The dots are printed on a strengthened paper substrate (top sheet 40 of FIG. 4) using a screen printing with 28 four millimeter dots per cell. The laminating sealing method used in this example is a registered die cut polyethylene sheet which is heat sealed in between the two top and bottom substrate sheets along the rims of the 12-cell mini-pouches. This single use 12-cell mini-pouched laundering product contains premeasured amounts of just about all that a laundry user would need.

In view of the above disclosure, one can appreciate that a preferred multi-pouched sheet article of this invention is all that a laundry user would need, for it is designed both for washer and dryer without detrimental substrate pilling. It can contain whiteners and stain removers, detergents and softeners to clean, soften, freshen and fight static with reduced staining and improvements over the problems mentioned in the Background.

What is claimed is:

1. A through-the-wash laundry product comprising:

(a) a water-permeable, water-insoluble fibrous substrate in the form of a pouch;

(b) a laundering composition enclosed within said substrate pouch, said substrate pouch having an outside surface; and (c) said substrate pouch having on its outside surface a water-insoluble, spaced-apart glue pattern adapted to reduce pilling of said fibrous substrate on the outside of said pouch when said product is used in the laundering of fabrics; and wherein the spaced-apart glue pattern covers from about 1% to about 70% of said outside surface and is present at a level of from about 3 grams to about 150 grams per square meter of said substrate.

2. The laundry product of claim 1 wherein the spaced-apart glue pattern covers from about 5% to about 30% of said outer surface and said level is 10–30 grams per square meter of substrate.

3. The laundry product of claim 1 wherein said glue pattern is a herringbone spaced-apart pattern.

4. The laundry product of claim 1 wherein said laundering composition contains materials selected from fabric softeners, antistats, soil release agents, detergents, bleaches, brighteners, enzymes, and combinations thereof.

5. The laundry product of claim 1 wherein said fibrous substrate is selected from the group consisting of polyesters, polyolefins, nylons, rayons, cellulose and mixtures thereof.

6. The laundry product of claim 1 wherein said pouch comprises a two-ply laminate made with one ply of a polyester material and a second ply of a cellulosic paper tissue material.

7. The laundry product of claim 1 wherein said pouch contains a through-the-wash fabric softener material.

8. The laundry product of claim 1 wherein said glue is selected from the group consisting of polyolefins, polyesters and polyamides.

* * * * *